United States Patent
Ott et al.

(10) Patent No.: US 8,511,911 B2
(45) Date of Patent: Aug. 20, 2013

(54) MULTI-FIBER LOOP BACK PLUG

(75) Inventors: Michael James Ott, Le Sueur, MN (US); Ronald J. Kleckowski, Manchester Center, VT (US); Thomas P. Huegerich, Manchester Center, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 276 days.

(21) Appl. No.: 12/841,643

(22) Filed: Jul. 22, 2010

(65) Prior Publication Data

US 2011/0026886 A1  Feb. 3, 2011

Related U.S. Application Data

(60) Provisional application No. 61/229,097, filed on Jul. 28, 2009.

(51) Int. Cl.
*G02B 6/36* (2006.01)

(52) U.S. Cl.
USPC .............................................. 385/78; 385/77

(58) Field of Classification Search
USPC ........................................................ 385/53–94
See application file for complete search history.

(56) References Cited

U.S. PATENT DOCUMENTS

| 6,439,776 | B1 * | 8/2002 | Harrison et al. ................. 385/53 |
| 6,454,464 | B1 | 9/2002 | Nolan |
| 6,654,523 | B1 | 11/2003 | Cole |
| 7,330,624 | B2 | 2/2008 | Isenhour et al. |
| 7,349,605 | B2 | 3/2008 | Noonan et al. |
| 7,596,293 | B2 | 9/2009 | Isenhour et al. |
| 7,630,593 | B2 * | 12/2009 | Furuno et al. ................... 385/14 |
| 2003/0123838 | A1 | 7/2003 | Wang et al. |
| 2006/0257092 | A1 | 11/2006 | Lu et al. |
| 2008/0131056 | A1 | 6/2008 | Isenhour et al. |
| 2009/0002689 | A1 | 1/2009 | Cobb, III et al. |

FOREIGN PATENT DOCUMENTS

JP   2000-81544   3/2000

OTHER PUBLICATIONS

International Search Report and Written Opinion mailed Feb. 1, 2011.

* cited by examiner

*Primary Examiner* — Daniel Petkovsek
(74) *Attorney, Agent, or Firm* — Merchant & Gould P.C.

(57) ABSTRACT

The present disclosure relates to a loop back plug including a ferrule having a distal side and a proximal side. The ferrule defines a plurality of openings that extend through the ferrule from the distal side to the proximal side. The openings are arranged in first and second parallel rows. The loop back plug also includes a plurality of loop back optical fibers each having first and second end portions secured within the openings of the ferrule. At least some of the loop back optical fibers are looped between the openings of the first and second rows with their first end portions secured within the openings of the first row and their second end portions secured within the openings of the second row.

18 Claims, 7 Drawing Sheets

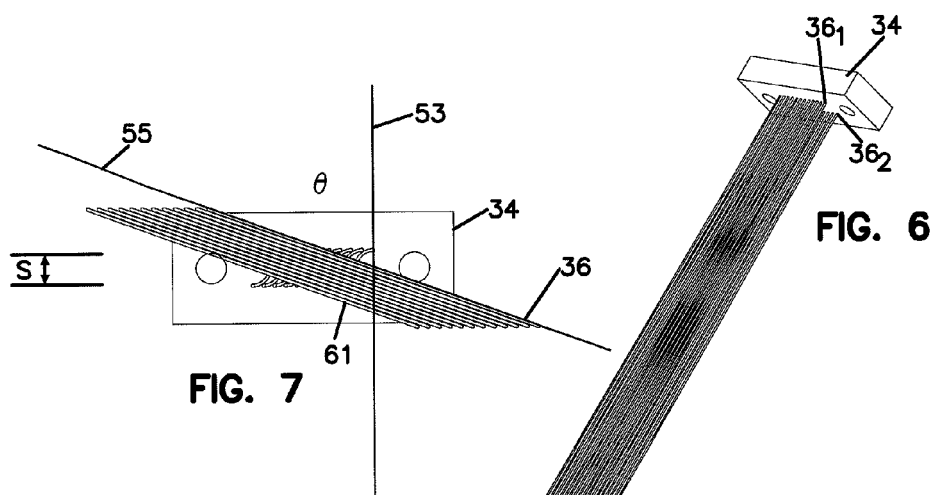
FIG. 6
FIG. 7
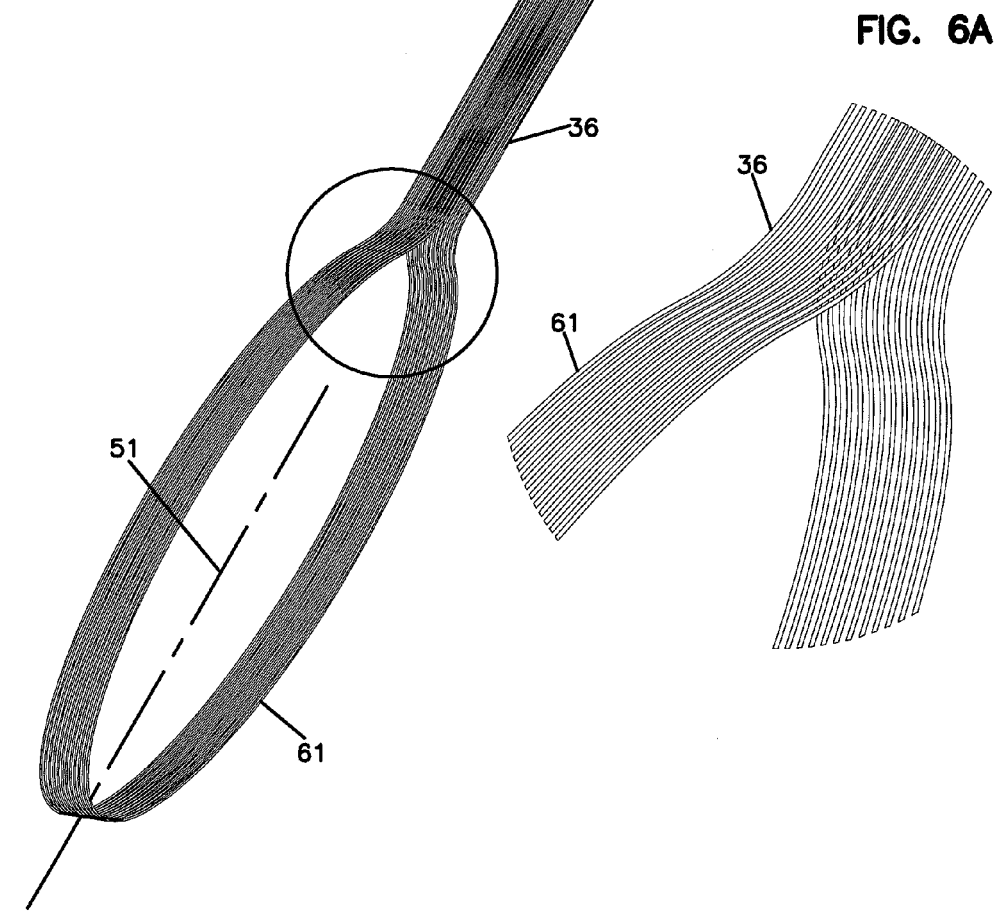
FIG. 6A

MULTI-FIBER LOOP BACK PLUG

CROSS-REFERENCE TO RELATED APPLICATION

This application claims the benefit of U.S. Provisional Patent Application Ser. No. 61/229,097, filed Jul. 28, 2009, which application is hereby incorporated by reference in its entirety.

TECHNICAL FIELD

The present disclosure relates generally to equipment for use in testing fiber optic systems. More particularly, the present disclosure relates to multi-fiber loop back plugs for use in looping back test signals in fiber optic systems.

BACKGROUND

Multi-fiber loop back plugs are used to facilitate testing fiber optic systems. Multi-fiber loop back plugs are used to loop back test signals such that the test signals can be transmitted and received from a single location. United States Patent Application Publication No. 2006/0257092 discloses a multi-fiber loop back plug adapted to be optically and mechanically coupled to a fiber optic connector. The multi-fiber loop back plug includes a ferrule having a connector interface side that engages an interface side of a ferrule of the fiber optic connector when the multi-fiber loop back plug and the fiber optic connector are coupled together. The multi-fiber loop back plug also includes a plurality of loop back optical fibers defining loop back paths. The loop back optical fibers have end portions supported by the ferrule of the multi-fiber loop back plug. The end portions of the loop back optical fibers have end faces that are aligned in a row at a connector interface side of the ferrule of the multi-fiber loop back plug.

SUMMARY

One aspect of the present disclosure relates to a multi-fiber loop back plug including a ferrule having a distal side and a proximal side. The distal side includes a connector interface surface. The ferrule defines openings that extend through the ferrule from the connector interface surface to the proximal side of the ferrule. The openings are arranged in first and second parallel rows. The loop back plug also includes a plurality of loop back optical fibers. The loop back optical fibers each include first and second end portions secured within the openings of the ferrule. End faces of the first and second end portions of the loop back optical fibers are positioned at the connector interface surface of the ferrule. At least some of the loop back optical fibers are looped between the first and second rows of openings such that the first end portions of the loop back optical fibers are positioned within the openings of the first row and the second portions of the loop back optical fibers are positioned within the openings of the second row. In one embodiment, the first and second rows of openings each include at least twelve openings. In further embodiments, the rows can include more or less than 12 openings securing fiber ends (e.g., 2 openings securing fiber ends, 4 openings securing fiber ends, 6 openings securing fiber ends, 8 openings securing fiber ends, 10 openings securing fiber ends, 14 openings securing fiber ends, etc.). Additionally, more than 2 rows of openings between which optical loop back fibers are looped can be provided (e.g., 4 rows, 6 rows, etc.).

A variety of additional aspects will be set forth in the description that follows. The aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 6 is a perspective view showing an example twist configuration for loop back optical fibers of the loop back plug of FIG. 1;

FIG. 6A is an enlargement of a portion of FIG. 6;

FIG. 7 is a rear view of the twist configuration of FIG. 6; and

DETAILED DESCRIPTION

Figure 1:
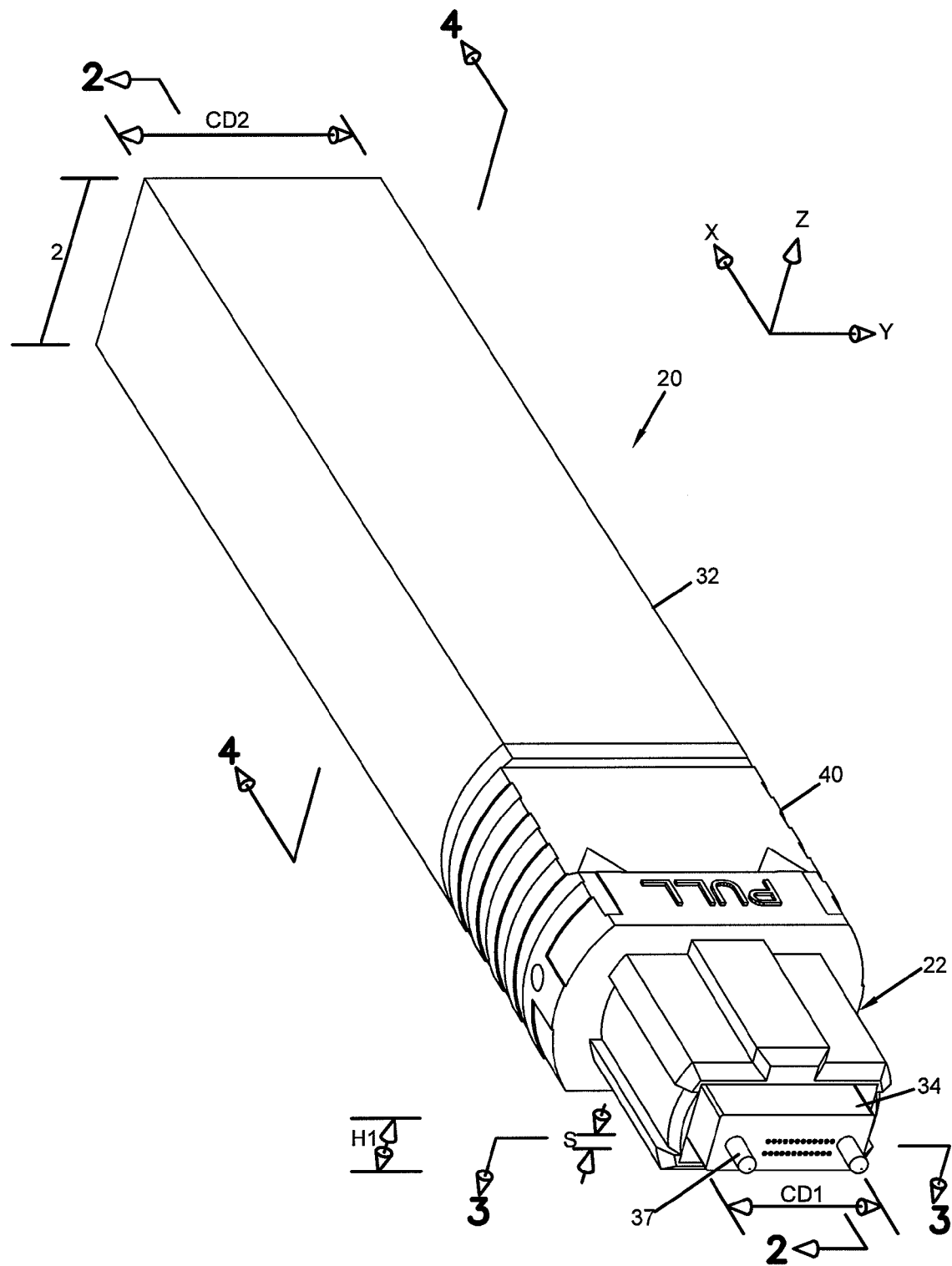
FIG. 1 is a perspective view of a loop back plug in accordance with the principles of the present disclosure.
Figure 2:
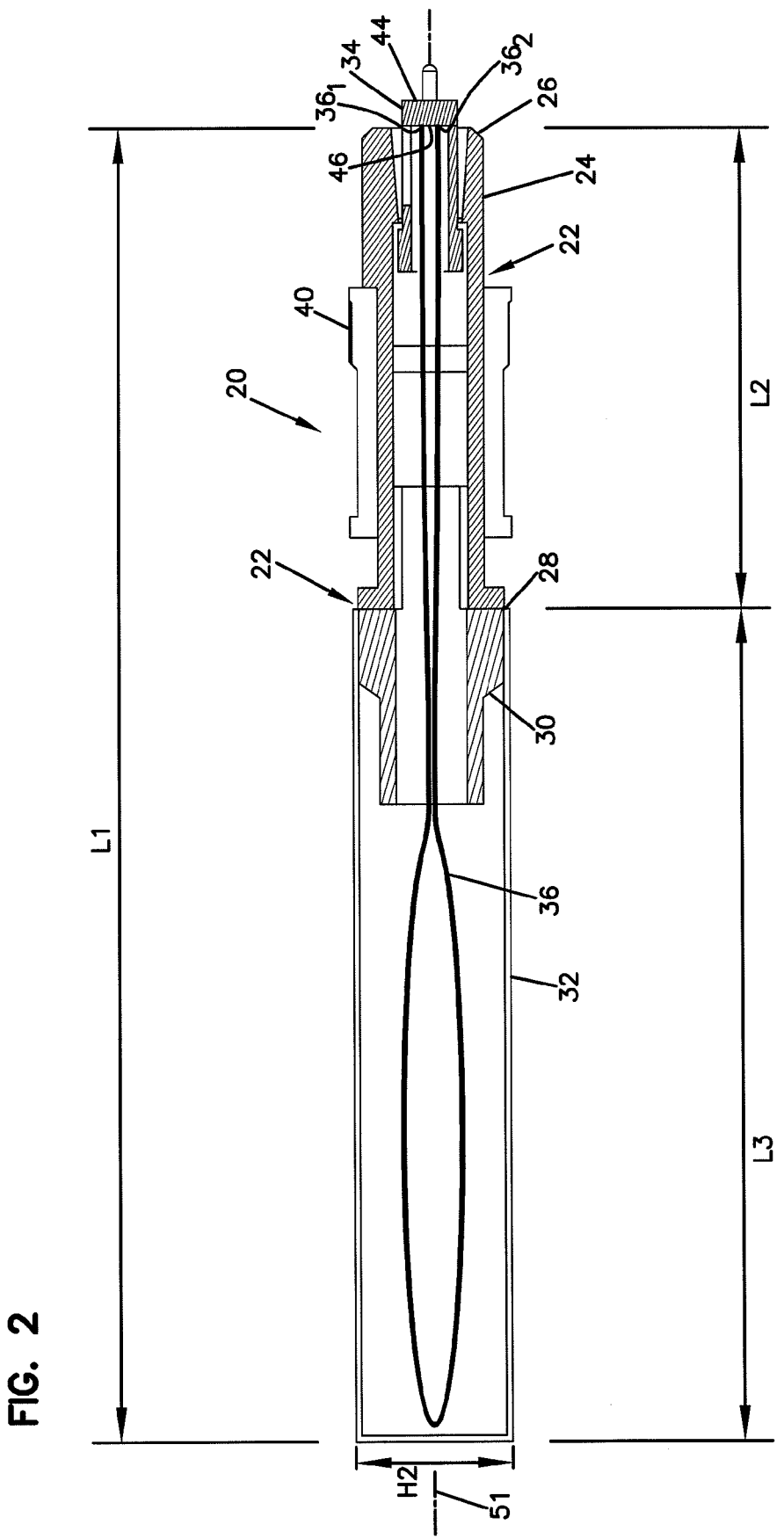
FIG. 2 is a cross-sectional view taken along section line 2-2 of FIG. 1.
Figure 3:
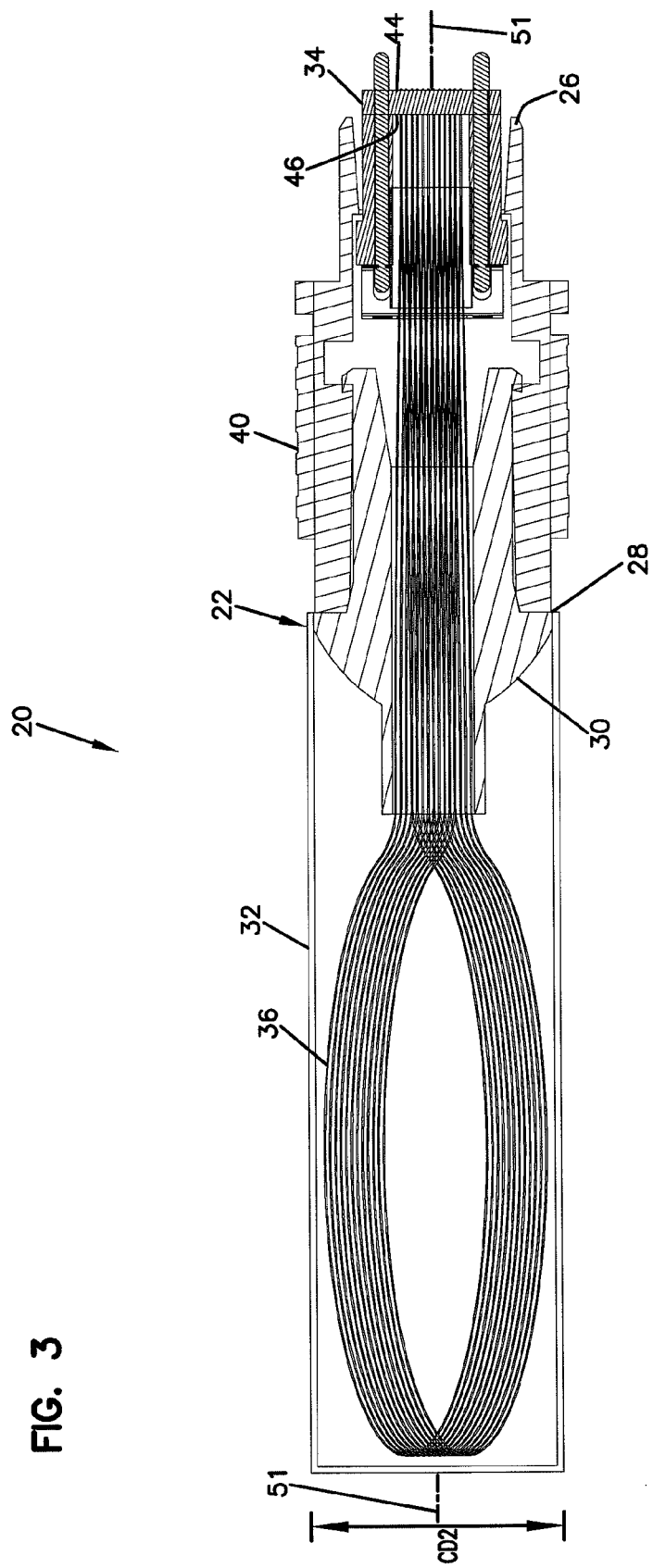
FIG. 3 is a cross-sectional view taken along section line 3-3 of FIG. 1.

FIGS. 1-3 show a multi-fiber loop back plug 20 in accordance with the principles of the present disclosure. The loop back plug 20 includes a plug body assembly 22 including a ferrule support piece 24 having a distal end 26 positioned opposite from a proximal end 28. The plug body assembly 22 also includes a spring stop 30 mounted at least partially inside the proximal end 28 of the ferrule support piece 24 and a proximal housing 32 that is mounted adjacent the proximal end 28 of the ferrule support piece 24. The loop back plug 20 also includes a ferrule 34 supporting end portions of a plurality of loop back optical fibers 36. The ferrule 34 is mounted at the distal end 26 of the ferrule support piece 24 and is biased in a distal direction by a spring (not shown) captured between the ferrule 34 and the spring stop 30. The loop back optical fibers 36 extend proximally from the ferrule through the spring stop 30 and into the proximal housing 32. The proximal housing 32 provides space for looping (i.e., reversing direction of) the loop back optical fibers 36 and also provides protection of the loop back optical fibers 36. Alignment pins 37 or other structures (e.g., pin receivers) can be provided on the ferrule 34 for providing alignment between the ferrule 34 and the ferrule of a connector to which the loop back plug is connected. In this way, ends of the loop back fibers 36 are aligned with fiber ends secured within the ferrule of the connector to which the loop back plug is connected.

The loop back plug 20 further includes a release sleeve 40 slidably mounted over the ferrule support piece 24. The release sleeve 40 is spring biased in a distal direction and can be slidably retracted on the ferrule support piece 24 to allow the loop back plug 20 to be disengaged from a fiber optic adapter.

Referring to FIGS. 2 and 3, the ferrule 34 includes a distal side 44 and a proximal side 46. The distal side 44 can also be referred to as a connector interface side or a connector interface surface of the ferrule 34. A plurality of fiber receiving openings 50 (see FIG. 5) are defined through the ferrule 34.

Figure 5:
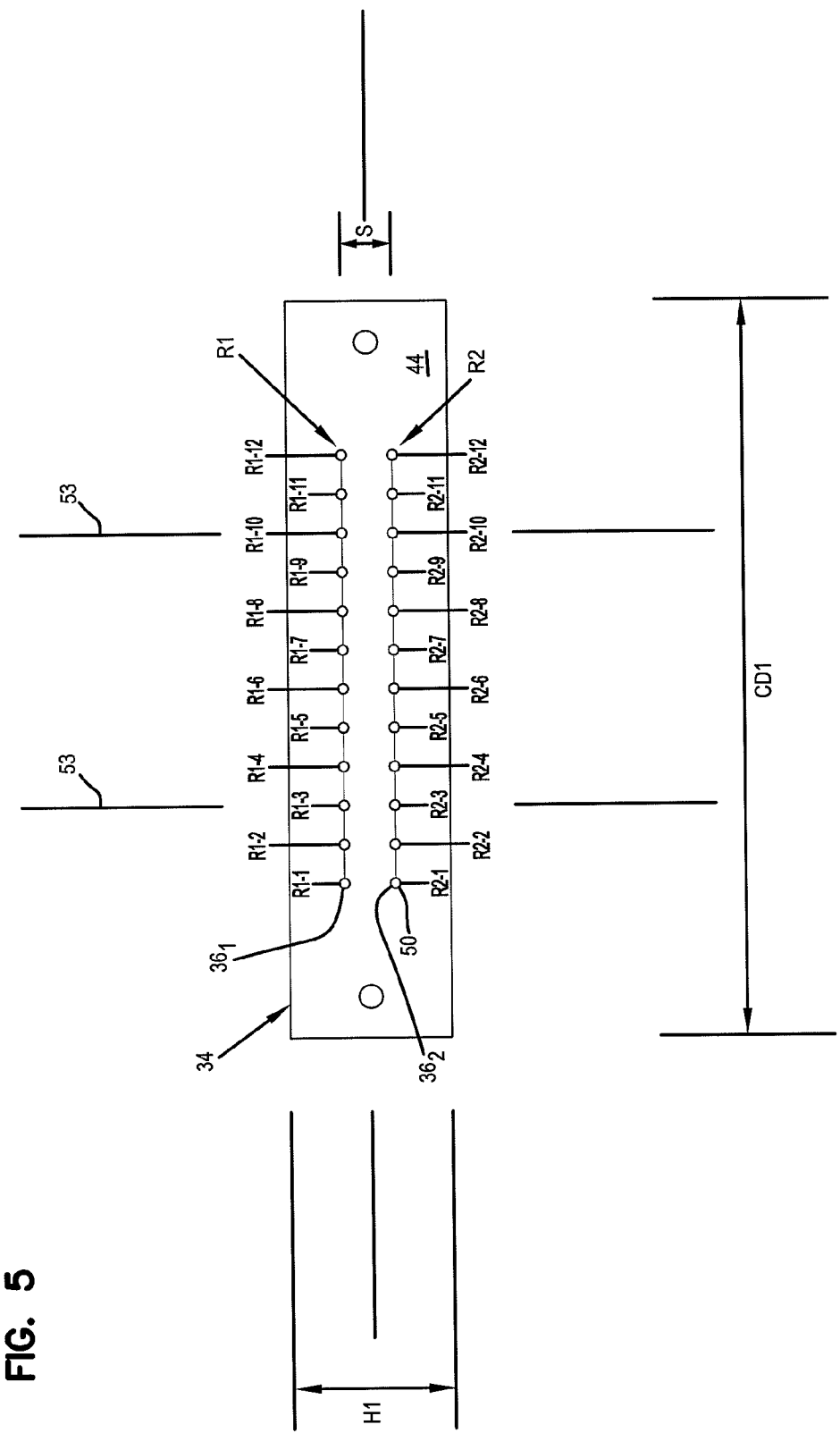
FIG. 5 shows a connector interface side of a ferrule used in the loop back plug of FIG. 1.

The fiber receiving openings 50 extend through the ferrule from the distal side 44 to the proximal side 46. As shown at FIG. 5, the fiber receiving openings 50 are arranged in first and second parallel rows R1 and R2. As shown at FIG. 5, the first row R1 is defined by twelve openings 50 defining optical connection positions R1-1 to R1-12. Also, the second row R2 includes twelve openings 50 defining optical connection positions R2-1 to R2-12. The loop back optical fibers 36 loop from one of the openings 50 of the first row R1 to one of the openings 50 of the second row R2.

Referring to FIG. 1, a first reference orientation X, a second reference orientation Y and a third reference orientation Z are depicted. The X orientation is orthogonal to the Y orientation and the Z orientation is orthogonal to both the X and Y orientations. The loop back plug 20 defines a central axis 51 that extends along the X orientation. The loop back plug 20 has a length L1 (see FIG. 2) that extends along the axis 51. In one embodiment, the length L1 is in the range of 55-75 millimeters. The distal side 44 of the ferrule 34 has a height H1 that extends along the Z orientation, and a cross-dimension CD1 that extends along the Y orientation. The cross-dimension CD1 is larger than the height H1. The ferrule support piece has a length L2 that extends along the X orientation and the proximal housing 32 has a length L3 that also extends along the X orientation. In one embodiment, the length L3 is larger than the length L2. In a preferred embodiment, the length L3 is at least 25 percent larger than the length L2. In an example embodiment, the length L3 is in the range of 30-50 millimeters and the length L2 is in the range of 20-30 millimeters. In another embodiment, the length L2 is about 25 millimeters and the length L3 is about 40 millimeters. The proximal housing 32 also defines a height H2 that extends along the Z orientation and a cross-dimension CD2 that extends along the Y orientation. In one embodiment, the length L3 is at least two and a half times larger than the cross-dimension CD2 and is at least four times larger than the height H2. In another embodiment, the cross-dimension CD2 is at least one and a half times larger than the height H2. In another embodiment, the height H2 is in the range of 7 to 10 millimeters and the cross-dimension CD2 is in the range of 10 to 20 millimeters. In still another embodiment, the height H2 is about 8 millimeters, the cross-dimension CD2 is about 13 millimeters, the length L3 is about 40 millimeters, and the total length L1 is about 65 millimeters. Of course, other embodiments of the present disclosure can use dimensions other than those specifically mentioned above.

The rows R1, R2 of openings 50 have lengths that extend along the cross-dimension CD1 of the ferrule 34 and the rows R1, R2 are separated by a center-to-center spacing S that extends across a height H1 of the ferrule. The openings of the corresponding optical connection positions of the rows R1, R2 are aligned along reference planes 53 (only two of the reference planes 53 are depicted in FIG. 5) that are parallel to the X and Z orientations and are orthogonal with respect to the Y orientation. For example, the openings 50 of the first optical connection positions R1-1, R2-1 are aligned along a first one of the reference planes 53, the openings 50 of the second optical connection positions R1-2, R2-2 are aligned along a second one of the reference planes 53, the openings of the third optical connection positions R1-3, R2-3 are aligned along a third one of the reference planes 53, the openings 50 of the fourth optical connections positions R1-4, R2-4 are aligned along a fourth one of the reference planes 53, the openings of the fifth optical connection positions R1-5, R2-5 are aligned along a fifth one of the reference planes 53, the openings of the sixth optical connection positions R1-6, R2-6 are aligned along a sixth one of the reference planes 53, the openings of the seventh optical connection positions R1-7, R2-7 are aligned along a seventh one of the reference planes 53, the openings 50 of the eighth optical connection positions R1-8, R2-8 are aligned along an eighth one of the reference planes 53, the openings 50 of the ninth optical connection positions R1-9, R2-9 are aligned along a ninth one of the reference planes 53, the openings of the tenth optical connection positions R1-10, R2-10 are aligned along a tenth one of the reference planes 53, the openings 50 of the eleventh optical connections positions R1-11, R2-11 are aligned along an eleventh one of the reference planes 53, and the openings of the twelfth optical connection positions R1-5, R2-5 are aligned along a twelfth one of the reference planes 53.

For the ferrule 34 depicted at FIG. 5, twelve of the loop back optical fibers 36 are used. In certain embodiments, the loop back fibers are each separate from one another and not mechanically coupled together by a polymeric matrix material such as the type of matrix material used to mechanically link optical fibers in a ribbon cable. Referring back to FIG. 3, each of the loop back optical fibers 36 includes a first end portion $36_1$ and a second end portion $36_2$. The first end portions $36_1$ of the fibers 36 are positioned in the openings 50 of the first row R1 and the second end portions $36_2$ of the fibers 36 are positioned in the openings 50 of the second row R2. In a direct loop back configuration, each of the fibers 36 has its end portions $36_1$, $36_2$ positioned within the same optical connection position of each row R1, R2. For example, a first one of the fibers 36 is looped between positions R1-1 and R2-1, a second one of the fibers is looped between positions R1-2 and R2-2, a third one of the fibers 36 is looped between positions R1-3 and R2-3, a fourth one of the fibers 36 is looped between positions R1-4 and R2-4, a fifth one of the fibers 36 is looped between positions R1-5 and R2-5, a sixth one of the fibers is looped between positions R1-6 and R2-6, a seventh one of the fibers 36 is looped between positions R1-7 and R2-7, an eighth one of the fibers 36 is looped between positions R1-8 and R2-8, a ninth one of the fibers 36 is looped between positions R1-9 and R2-9, a tenth one of the fibers is looped between positions R1-10 and R2-10, an eleventh one of the fibers 36 is looped between positions R1-11 and R2-11 and a twelfth one of the fibers 36 is looped between positions R1-12 and R2-12. In the direct loop back configuration, the end portions $36_1$, $36_2$ of each of the fibers 36 have a center-to-center spacing equal to the spacing S that extends along the height H1 of the ferrule 34. The end portions $36_1$ and $36_2$ are preferably secured within the openings 50 by epoxy or other technique for retaining the end portions $36_1$, $36_2$ within the openings 50. In the direct loop back configuration, the end portions $36_1$, $36_2$ of each of the fibers 36 are directly vertically spaced-apart and are aligned along the vertical reference planes 53.

In a cross-connect loop back configuration, at least some of the fibers 36 have their end portions $36_1$, $36_2$ positioned within different optical connection positions of each row R1, R2. For example, in one cross-connect loop back configuration, a first one of the fibers 36 is looped between positions R1-1 and R2-12, a second one of the fibers is looped between positions R1-2 and R2-11, a third one of the fibers 36 is looped between positions R1-3 and R2-10, a fourth one of the fibers 36 is looped between positions R1-4 and R2-9, a fifth one of the fibers 36 is looped between positions R1-5 and R2-8, a sixth one of the fibers is looped between positions R1-6 and R2-7, a seventh one of the fibers 36 is looped between positions R1-7 and R2-6, an eighth one of the fibers 36 is looped between positions R1-8 and R2-5, a ninth one of the fibers 36 is looped between positions R1-9 and R2-4, a tenth one of the fibers is looped between positions R1-10 and R2-3, an eleventh one of the fibers 36 is looped between positions R1-11 and R2-2 and a twelfth one of the fibers 36 is looped between positions R1-12 and R2-1. The end portions $36_1$ and $36_2$ are preferably secured within the openings 50 by epoxy or other technique for retaining the end portions $36_1$, $36_2$ within the openings 50. In the cross-connect loop back configuration, the end portions $36_1$, $36_2$ of each of the fibers 36 are not directly vertically spaced-apart, and are instead positioned along reference planes aligned at oblique angles relative to the vertical reference planes 53. In other embodiments, the loop back optical fibers 36 can be looped between connection positions other than those specifically mentioned above.

Figure 4:
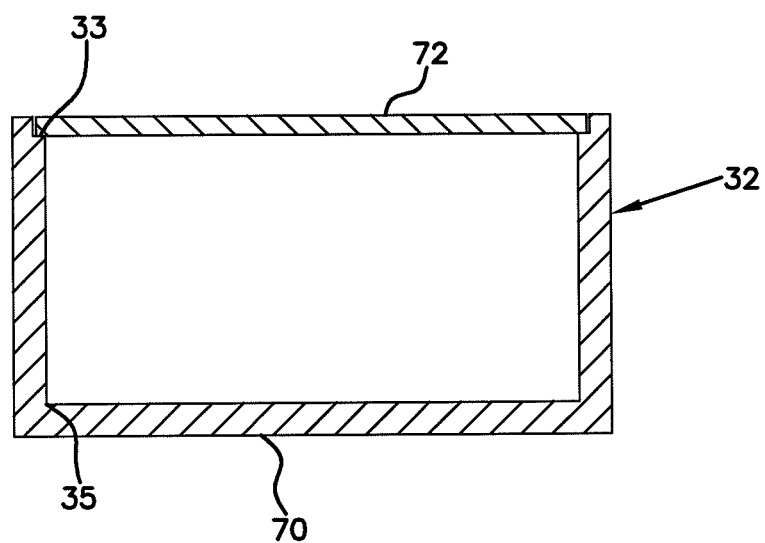
FIG. 4 is a cross-sectional view taken along section 4-4 of FIG. 1.

Referring to FIGS. 1 and 4, the proximal housing 32 is generally rectangular defines an interior space in which curved portions of the loop back optical fibers 36 are located. In one embodiment, the proximal housing 32 can include a first primary component 70 that defines the overall interior volume of proximal housing 32, and a cover piece 72 that mounts on the primary component 70 to enclose the interior volume. In certain embodiments, the cover 72 can be secured to the primary component 70 by techniques such as a snap fit connection, epoxy or other adhesives, ultrasonic welding, or other techniques. The proximal housing 32 includes an open end 33 positioned opposite from a closed end 35. The open end is sized to fit over the proximal end of the spring stop 30. The closed end 35 is proximally offset from the open end 33.

As indicated above with respect to the direct loop back configuration, the end portions $36_1$, $36_2$ of each of the loop back fibers 36 are secured within the ferrule 34 and are aligned along the reference planes 53 that are parallel to the Z and X orientations, and are perpendicular relative to the Y orientation. From the ferrule 34, the loop back fibers 36 extend in a proximal direction along the X orientation through the ferrule support piece 24 and the spring stop 30 into the proximal housing 32. As the loop back fibers 36 extend in a proximal direction, the loop back fibers 36 twist such that curved/bent portions 61 of the loop back fibers 36 extend at least partially in the direction Y across at least a portion of the cross-dimension CD2 of the proximal housing 32. In this way, the curved portions 61 of the loop back fibers 36 extend generally along reference planes 55 that are aligned at angles θ relative to their corresponding reference planes 53. In other words, the curved portion 61 of each of the loop back fibers 36 extends generally along a reference plane (e.g., reference plane 55) that is rotationally offset from the reference plane 53 in which the corresponding end portions $36_1$, $36_2$ are aligned. In certain embodiments, the angles θ are greater than 20 degrees, or greater than 30 degrees or in the range of 20-90 degrees, or in the range of 30-90 degrees, or in the range of 45-90 degrees. These angles also represent the degree of twist applied to the fiber loops. The rotational offset between the ends $36_1$, $36_2$ of the fibers 36 and the curved portions 61 of the fibers allows the loop back fibers 36 to more easily satisfy bend radius requirements by utilizing the larger dimension provided by the cross-dimension CD2 as compared to the height H2.

Referring to FIGS. 2 and 3, the loop back fibers 36 extend from the first end portions $36_1$ in a proximal direction until the loop back fibers reach the curved portions 61. At the curved portions 61, the loop back fibers 36 gradually reverse direction. For example, the curved portions 61 can form partial loops such as a half loops that transition the direction of extension of the loop back fibers 36 from a proximal direction to a distal direction. After extending thorough the curved portions 61, the loop back fibers 36 extend in a distal direction to the second end portions $36_2$. As the curved portions 61 transition the direction of extension of the loop back fibers 36 from proximal to distal, the curved portions 61 curve at least partially across the cross-dimension CD2 of the proximal housing 32.

FIGS. 6, 6A and 7 show an example configuration in which the rotational offset between the reference planes 53, 55 is provided by twisting the entire group/bunch of loop back fibers 36 about the central axis 51. In other embodiments, each of the fibers 36 may be individually twisted or otherwise handled to provide rotational offset between the end portions $36_1$, $36_2$ and the curved portions.

In the case of the cross-connect loop back configuration, the loop back fibers 36 are also twisted to allow the curved portions 61 to curve at least partially across the cross-dimension CD2 of the proximal housing 32 as the loop back fibers transition from a proximal direction of extension to a distal direction of extension. However, since the end portions $36_1$, $36_2$ are not aligned along the reference planes 53, the amount of twist is referenced with respect to reference planes that are obliquely aligned relative to the reference planes 53.

Figure 8:
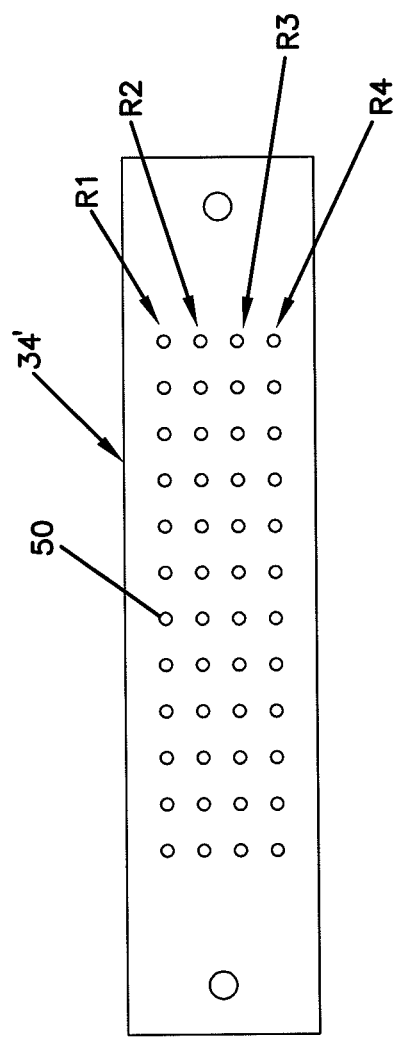
FIG. 8 shows a connector interface side of an alternative ferrule that can be used with the loop back plug of FIG. 1.

FIG. 8 shows an alternative ferrule 34' that can be used with the loop back plug of FIG. 1. The ferrule 34' defines forty-eight openings 50 adapted to receive the end portions $36_1$, $36_2$ of a plurality (e.g., 24) loop back optical fibers 36. The openings 50 are arranged in four rows R1-R4. In one embodiment, half the loop back optical fibers 36 are looped between the openings 50 of rows R1 and R2 and the other half of the loop back optical fibers 36 are looped between openings 50 of the rows R3 and R4. In another embodiment, half of the loop back optical fibers 36 are looped between the openings 50 of rows R1 and R4 and the other half of the loop back optical fibers 36 are looped between openings 50 of the rows R2 and R3. In a further embodiment, half of the loop back optical fibers 36 are looped between the openings 50 of rows R1 and R3 and the other half of the loop back optical fibers 36 are looped between openings 50 of the rows R2 and R4. As described previously, the loop back optical fibers 36 can be arranged in a direct loop back configuration, cross-connect loop back configuration or other type of configuration.

In other embodiments, more than 4 rows of openings can be provided through the ferrule for receiving the ends of loop back fibers. For example, an alternative embodiment can include six rows (rows R1-R6) of openings 50 (e.g., 12 openings) with loop back fibers looped between openings of the rows R1-R6. For example, the fibers 36 can be looped between rows R1 and R2; between rows R3 and R4; and between rows R5 and R6. In other embodiments, the fibers 36 can be looped between any selected two rows in the array. As described previously, the loop back optical fibers 36 can be arranged in a direct loop back configuration, a cross-connect loop back configuration or other type of configuration.

From the foregoing detailed description, it will be evident that modifications and variations can be made in the devices of the disclosure without departing from the spirit or scope of the disclosure.

What is claimed is:

1. A loop back plug comprising:
   a ferrule including a distal side and a proximal side, the ferrule defining a plurality of openings that extend through the ferrule from the distal side to the proximal side, the openings being arranged in first and second parallel rows; and
   a plurality of loop back optical fibers each having first and second end portions secured within the openings of the ferrule, at least some of the loop back optical fibers being looped between the openings of the first and second rows with their first end portions secured within the openings of the first row and their second end portions secured within the openings of the second row, wherein an opening in the first row receiving a first end portion of a predetermined fiber and an opening in the second row receiving a second end portion of the predetermined fiber define a first reference plane, and wherein a curved portion of each loopback fiber extends along a second reference plane offset at an angle from the first reference plane.

2. The loop back plug of claim 1, wherein each of the first and second rows includes twelve openings in which the first and second end portions of the loop back optical fibers are supported.

3. The loop back plug of claim 1, wherein the first and second rows of openings include first openings positioned at the first row and second openings positioned at the second row, wherein each of the loop back optical fibers is looped between the first and second openings with the first end portions positioned within the first openings and the second end portions positioned within the second openings, wherein the first and second end portions of the loop back optical fibers are aligned along first reference planes, and wherein the loop back optical fibers include curved portion that extend along second reference planes that are oriented at angles relative to their corresponding first reference planes.

4. The loop back plug of claim 3, wherein the angles are greater than 20 degrees.

5. The loop back plug of claim 3, wherein the angles are in the range of 20-90 degrees.

6. The loop back plug of claim 3, wherein the angles are in the range of 30-90 degrees.

7. The loop back plug of claim 3, wherein the first row includes 12 of the first openings and the second row includes 12 of the second openings, wherein 12 of the loop back optical fibers are each looped between the first and second openings, wherein the loop back plug defines a central longitudinal axis that extends through the ferrule in a distal to proximal direction, and wherein the 12 loop back optical fibers are twisted about the central longitudinal axis to provide the angles between the first and second reference planes.

8. The loop back plug of claim 3, wherein the first reference planes are parallel to one another and the loop back optical fibers are arranged in a direct loop back configuration.

9. The loop back plug of claim 3, wherein the first reference planes are not parallel to one another and the loop back optical fibers are arranged in a cross-connect loop back configuration.

10. A loop back plug having an X reference orientation, a Y reference orientation and a Z reference orientation, the Y reference orientation being orthogonal to X reference orientation and the Z reference orientation being orthogonal to both the X reference orientation and the Y reference orientation, the loop back plug also including a central axis that is parallel to the X reference orientation and that extends in a distal to proximal direction, the loop back plug comprising:
a ferrule including a distal side and a proximal side, the ferrule defining a plurality of openings that extend through the ferrule from the distal side to the proximal side, the openings being arranged in first and second parallel rows that extend along the Y reference orientation, the first and second rows of openings defining optical connection positions that are aligned along parallel first reference planes, the first reference planes being parallel to the Z reference orientation and the X reference orientation, the first reference planes being perpendicular to the Y reference orientation;
a ferrule support structure for supporting the ferrule, the ferrule support structure including a distal end at which the ferrule is positioned;
a proximal housing positioned proximally with respect to the ferrule support structure, the proximal housing including a length that extends along the X reference orientation, a cross-dimension that extends along the Y reference orientation, and a height-dimension that extends along the Z reference orientation, the cross-dimension being larger than the height; and
a plurality of loop back optical fibers that extend proximally from the ferrule, each of the loop back optical fibers having first and second end portions secured within the openings of the ferrule, each of the loop back optical fibers being looped between the first and second rows of openings, each of the loop back optical fibers including a partial loop portion positioned within the proximal housing that loops at least partially across both of the cross-dimension and the height-dimension of the proximal housing, wherein at least some of the partial loop portions curve generally along second reference planes that are aligned at angles relative to the first reference planes.

11. The loop back plug of claim 10, wherein the proximal housing is generally rectangular.

12. The loop back plug of claim 11, wherein the proximal housing includes an open end that is distally offset from a closed end.

13. The loop back plug of claim 12, wherein the proximal housing defines an interior volume in which the partial loop portions of the loop back optical fibers are positioned, wherein the proximal housing includes a main piece that defines a majority of the interior volume of the proximal housing, and wherein the proximal housing includes a cover piece that mounts to the main piece to enclose the interior volume.

14. The loop back plug of claim 10, wherein the angles are greater than 20 degrees.

15. The loop back plug of claim 14, wherein the angles are in the range of 20-90 degrees.

16. The loop back plug of claim 14, wherein the angles are in the range of 30-90 degrees.

17. The loop back plug of claim 10, wherein each of the first and second rows includes twelve openings in which the first and second end portions of the loop back optical fibers are supported.

18. The loop back plug of claim 10, wherein the first and second end portions of each of the loop back optical fibers are aligned along one of the first reference planes.

* * * * *